US012236856B2

(12) United States Patent
Wang et al.

(10) Patent No.: US 12,236,856 B2
(45) Date of Patent: Feb. 25, 2025

(54) DISPLAY DRIVER CIRCUIT AND DISPLAY DEVICE

(71) Applicants: Chengdu BOE Optoelectronics Technology Co., Ltd., Sichuan (CN); BOE Technology Group Co., Ltd., Beijing (CN)

(72) Inventors: Bilin Wang, Beijing (CN); Yuanzhou Hu, Beijing (CN); Xiaohuan Chang, Beijing (CN); Yanni Jiang, Beijing (CN); Guoqiang Wu, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/026,285

(22) PCT Filed: Apr. 14, 2022

(86) PCT No.: PCT/CN2022/086909
§ 371 (c)(1),
(2) Date: Mar. 14, 2023

(87) PCT Pub. No.: WO2023/197265
PCT Pub. Date: Oct. 19, 2023

(65) Prior Publication Data
US 2024/0304138 A1 Sep. 12, 2024

(51) Int. Cl.
*G09G 3/3208* (2016.01)

(52) U.S. Cl.
CPC ..... *G09G 3/3208* (2013.01); *G09G 2330/021* (2013.01); *G09G 2330/06* (2013.01)

(58) Field of Classification Search
CPC ...... G09G 3/3208; G09G 3/2092; G09G 3/36; G09G 5/003; G09G 5/006
See application file for complete search history.

(56) References Cited

U.S. PATENT DOCUMENTS

| | | | |
|---|---|---|---|
| 6,570,405 B1 | | 5/2003 | Lien |
| 2003/0146788 A1 | | 8/2003 | Maki |

(Continued)

FOREIGN PATENT DOCUMENTS

| | | |
|---|---|---|
| CN | 1617202 A | 5/2005 |
| CN | 100346382 C | 10/2007 |

(Continued)

OTHER PUBLICATIONS

RM0008-Reference manual-STM32F103ZET6, Section 5.1 Power supplies, 9. General-purpose and alternate-function I/Os (GPIOs and AFIOs) 9.1.7-9.1.9, STMicroelectronics, Feb. 23, 2021.

*Primary Examiner* — Sardis F Azongha
(74) *Attorney, Agent, or Firm* — IPro, PLLC

(57) ABSTRACT

In a display driver circuit, a push-pull circuit is coupled to an internal circuit, a first external power terminal, a second external power terminal and a target node respectively, and can control the on-off of the first external power terminal, the second external power terminal and the target node in response to a target control signal transmitted by the internal circuit. The switching circuit is coupled to the target node and the I/O interface of the display driver circuit respectively, and can transmit an electric potential of the target node to the I/O interface of the display driver circuit, that is, a first power signal transmitted from the first external power terminal to the target node or a second power signal transmitted from the second external power terminal to the target node is further output to the I/O interface.

14 Claims, 6 Drawing Sheets

(56) References Cited

U.S. PATENT DOCUMENTS

| | | | | |
|---|---|---|---|---|
| 2005/0116890 | A1 | 6/2005 | Lee et al. | |
| 2006/0071839 | A1* | 4/2006 | Shieh | H03M 1/0604 341/155 |
| 2010/0133583 | A1* | 6/2010 | Mawatari | H01L 27/0259 257/E29.211 |
| 2014/0160607 | A1 | 6/2014 | Reimann et al. | |
| 2015/0288173 | A1 | 10/2015 | Chen et al. | |
| 2017/0338742 | A1 | 11/2017 | Veeramreddi et al. | |
| 2019/0123551 | A1* | 4/2019 | Yuan | H02H 9/046 |
| 2020/0394944 | A1 | 12/2020 | Wang et al. | |
| 2022/0383812 | A1 | 12/2022 | Zhu et al. | |
| 2023/0223394 | A1* | 7/2023 | Stockinger | H01L 27/0255 361/56 |

FOREIGN PATENT DOCUMENTS

| | | | | | |
|---|---|---|---|---|---|
| CN | 101752369 | B | | 11/2011 | |
| CN | 107068036 | A | | 8/2017 | |
| CN | 103855703 | B | | 9/2017 | |
| CN | 104979814 | B | | 12/2017 | |
| CN | 207782448 | U | | 8/2018 | |
| CN | 109036322 | A | | 12/2018 | |
| CN | 109155588 | A | | 1/2019 | |
| CN | 109285526 | A | * | 1/2019 | G09G 3/3696 |
| CN | 210479050 | U | | 5/2020 | |
| CN | 113169663 | A | | 7/2021 | |
| CN | 113508429 | A | | 10/2021 | |
| CN | 113965195 | A | | 1/2022 | |
| JP | 2003229725 | A | | 8/2003 | |

* cited by examiner

DISPLAY DRIVER CIRCUIT AND DISPLAY DEVICE

CROSS-REFERENCE TO RELATED APPLICATION

This application is a U.S. national stage of international application No. PCT/CN2022/086909, filed on Apr. 14, 2022, the disclosures of which are incorporated herein by reference in its entirety.

TECHNICAL FIELD

The present disclosure relates to the field of display technologies, and particularly to a display driver circuit and a display device.

BACKGROUND OF THE INVENTION

Organic light-emitting diode (OLED) display devices are widely used in the display field due to their advantages of self-luminescence, small thickness, light weight, high luminous efficiency and the like.

In the related art, an OLED display device generally includes an application processor (AP), a flash integrated circuit (Flash IC), and a display driver integrated circuit (DDIC). The AP and the Flash IC are both coupled to an input/output (I/O) interface of the DDIC to communicate with the DDIC. Moreover, the AP generally has an operating voltage of about 1.2 V, and the Flash IC generally has an operating voltage of about 1.8 V.

However, each of the I/O interfaces in the DDIC currently has a fixed operating voltage. For example, the I/O interface in the DDIC has an operating voltage of 1.2 V or 1.8 V, and thus has poor compatibility.

SUMMARY OF THE INVENTION

An embodiment of the present disclosure provides a display driver circuit and a display device, and the technical solutions are as follows:

In one aspect, a display driver circuit is provided. The display driver circuit includes an input/output (I/O) interface, an internal circuit, a push-pull circuit, and a switching circuit;

the internal circuit is coupled to the push-pull circuit and the internal circuit is configured to transmit a target control signal to the push-pull circuit;

the push-pull circuit is further coupled to a first external power terminal, a second external power terminal, and a target node, and the push-pull circuit is configured to control the on-off of the first external power terminal and the target node and an on-off of the second external power terminal and the target node in response to the target control signal;

the switching circuit is coupled to a first control terminal, the I/O interface and the target node respectively, and the switching circuit is configured to transmit an electric potential of the target node to the I/O interface in response to a first control signal provided by the first control terminal; and an electric potential of a first power signal provided by the first external power terminal is greater than that of a second power signal provided by the second external power terminal.

Optionally, the push-pull circuit includes a first switching sub-circuit and a second switching sub-circuit;

the first switching sub-circuit is coupled to the internal circuit, the first external power terminal, and the target node respectively, and the first switching sub-circuit is configured to control the on-off of the first external power terminal and the target node in response to the target control signal provided by the internal circuit; and the second switching sub-circuit is coupled to the internal circuit, the second external power terminal, and the target node respectively, and the second switching sub-circuit is configured to control the on-off of the second external power terminal and the target node in response to the target control signal provided by the internal circuit.

Optionally, the first switching sub-circuit includes a first transistor; the second switching sub-circuit includes a second transistor, and the first transistor is of a different type from the second transistor;

a gate of the first transistor is coupled to the internal circuit, a first electrode of the first transistor is coupled to the first external power terminal, and a second electrode of the first transistor is coupled to the target node; and a gate of the second transistor is coupled to the internal circuit, a first electrode of the second transistor is coupled to the second external power terminal, and a second electrode of the second transistor is coupled to the target node.

Optionally, the first transistor is a P-type transistor, and the second transistor is an N-type transistor.

Optionally, the switching circuit includes a third transistor and a fourth transistor, and the third transistor is of a different type from the fourth transistor; and a gate of the third transistor and a gate of the fourth transistor are both coupled to the first control terminal, a first electrode of the third transistor and a first electrode of the fourth transistor are both coupled to the target node, and a second electrode of the third transistor and a second electrode of the fourth transistor are both coupled to the I/O interface.

Optionally, the third transistor is a P-type transistor, and the fourth transistor is an N-type transistor.

Optionally, the display driver circuit further includes an electrostatic discharge circuit;

the electrostatic discharge circuit is coupled to the first external power terminal, the second external power terminal, and the I/O interface respectively, and the electrostatic discharge circuit is configured to discharge static electricity generated at the I/O interface based on the first power signal and the second power source signal.

Optionally, the electrostatic discharge circuit includes a fifth transistor and a sixth transistor, and the fifth transistor is of a different type from the sixth transistor;

a gate and a first electrode of the fifth transistor are both coupled to the first external power terminal, and a second electrode of the fifth transistor is coupled to the I/O interface; and a gate and a first electrode of the sixth transistor are both coupled to the second external power terminal, and a second electrode of the sixth transistor is coupled to the I/O interface.

Optionally, the fifth transistor is a P-type transistor, and the sixth transistor is an N-type transistor.

Optionally, the display driver circuit further includes a current limiting resistor connected in series between the switching circuit and the I/O interface, and the display driver circuit is configured to perform current limiting protection on the electric potential transmitted to the I/O interface.

Optionally, the display driver circuit further includes a Schottky trigger and a protection circuit;

the Schottky trigger is coupled to the internal circuit and the I/O interface respectively, and the Schottky trigger is configured to receive an analog power signal provided by the I/O interface, convert the analog power signal into a digital power signal, and transmit the digital power signal to the internal circuit;

the protection circuit is coupled to the I/O interface, the first external power terminal, the second external power terminal, and the second control terminal respectively, and the protection circuit is configured to stabilize the electric potential at the I/O interface based on the first power signal and the second power signal in response to a second control signal provided by the second control terminal; and the internal circuit is further coupled to the I/O interface, and the internal circuit is further configured to receive the analog power signal provided by the I/O interface.

Optionally, the protection circuit includes a pull-up resistor, a pull-down resistor, a first switch, and a second switch;

a control terminal of the first switch is coupled to the second control terminal, a first terminal of the first switch is coupled to the first external power terminal, and a second terminal of the first switch is coupled to a first terminal of the pull-up resistor;

a control terminal of the second switch is coupled to the second control terminal, a first terminal of the second switch is coupled to the second external power terminal, and a second terminal of the second switch is coupled to a first terminal of the pull-down resistor; and a second terminal of the pull-up resistor and a second terminal of the pull-down resistor are both coupled to the I/O interface.

Optionally, the electric potential of the first power signal is 1.2 V or 1.8 V, and the electric potential of the second power signal is 0 V.

In another aspect, a display device is provided. The display device including an application processor, a memory circuit, and a power management integrated circuit, and the display driver circuit as described above;

the application processor, the memory circuit, and the power management integrated circuit are all coupled to I/O interfaces of the display driver circuit, and the I/O interfaces coupled by the application processor, the memory circuit, and the power management integrated circuit are different; and the application processor is in bidirectional communication with the display driver circuit, the memory circuit is in bidirectional communication with the display driver circuit, and the display driver circuit is configured to provide a power signal to the power management integrated circuit.

Optionally, the display device includes an organic light-emitting diode (OLED) display device.

BRIEF DESCRIPTION OF THE DRAWINGS

For clearer descriptions of the technical solutions according to the embodiments of the present invention, the drawings required to be used in the description of the embodiments are briefly introduced below. It is apparent that the drawings in the description below are only some embodiments of the present invention, and for those of ordinary skill in the art, other drawings may be obtained from the drawings without creative efforts.

DETAILED DESCRIPTION

Figure 1:
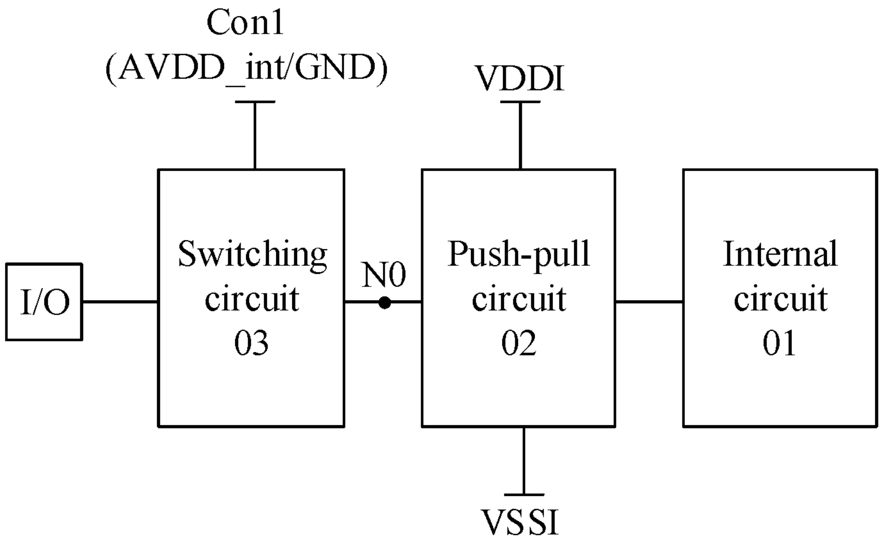
FIG. 1 is a schematic structural diagram of a display driver circuit according to an embodiment of the present disclosure.

For clearer descriptions of the objects, technical solutions, and advantages of the present disclosure, the embodiments of the present disclosure are further described in detail below with reference to the drawings.

A display device generally includes an application processor (AP), a flash integrated circuit (Flash IC), a display driver integrated circuit (hereinafter referred to as display driver circuit, DDIC), and a power management integrated circuit (Power Management IC). A logic circuit included in the DDIC generally has a supply voltage of 1.65 V to 1.95 V, and typically 1.8 V. Moreover, with the rapid development of fabrication (FAB) processes, a process of AP has been increased from 7 nanometers (nm) to 5 nm, and as a result, a voltage of an interactive signal between the AP and the DDIC (which may be referred to as communication voltage) is decreased from 1.8 volts (V) to 1.2 V. For example, each of the I/O interfaces of the DDIC may be controlled by the voltage of 1.2 V provided by the AP. However, the Flash IC and the PMIC do not require a 5 nm process due to the influence of current cost and process factors. Therefore, a communication voltage between the Flash IC and the PMIC and the DDIC is still typically 1.8 V. Moreover, the voltage currently output from the I/O interface of the DDIC to other circuits generally takes 1.8 V as a reference, and the voltage input to the DDIC from other circuits is directly transmitted to the DDIC through the I/O interface. The whole circuit architecture of the DDIC is simple, and has poor communication stability.

Based on this, an embodiment of the present disclosure provides a new DDIC, and each of the I/O interfaces of the DDIC may be compatible with a dual voltage transmission of 1.2 V and 1.8 V, and may also be compatible with a low voltage transmission of 0 V. This can better adapt to the improvement of FAB process capability and meet the communication requirements of the application processor (AP) prepared in the 5 nm process, and thus has high output multiplexing efficiency.

FIG. 1 is a schematic structural diagram of a display driver circuit according to an embodiment of the present disclosure. As shown in FIG. 1, the display driver circuit includes an input/output (I/O) interface, an internal circuit 01, a push-pull circuit 02, and a switching circuit 03.

The internal circuit 01 is coupled to the push-pull circuit 02. The internal circuit 01 is configured to transmit a target control signal to the push-pull circuit 02.

Optionally, the internal circuit 01 may include a plurality of components such as an analog circuit, a digital circuit, and an instruction register. In the embodiment of the present disclosure, a circuit capable of providing a target control signal is referred to as the internal circuit 01, and the target control signal is referred to as an internal signal provided by the display driver circuit. The internal circuit 01 may transmit a plurality of target control signals of different electric potentials to the push-pull circuit 02, so as to flexibly control the operation of the push-pull circuit 02. Based on this, the target control signal may also be referred to as an enable signal.

For example, the instruction register in the internal circuit 01 may pre-store a register instruction. Receiving the register instruction, the internal circuit 01 may generate a target control signal of a corresponding electric potential based on the content in the instruction, and transmit the target control signal to the push-pull circuit 02. For example, the internal circuit 01 may generate a target control signal of a first electric potential or a target control signal of a second electric potential.

The push-pull circuit 02 is further coupled to a first external power terminal VDDI, a second external power terminal VSSI, and a target node N0. The push-pull circuit 02 is configured to control an on-off of the first external power terminal VDDI and the target node N0 and the an on-off of the second external power terminal VSSI and the target node N0 in response to the target control signal.

For example, the push-pull circuit 02 may control the first external power terminal VDDI to be conducted to the target node N0 and control the second external power terminal VSSI to be decoupled from the target node N0 in a case that the target control signal is of the first electric potential. At this time, in the first external power terminal VDDI and the second external power terminal VSSI, a first power signal provided by the first external power terminal VDDI may be transmitted to the target node N0, that is, a signal written into the target node N0 at this time may be the first power signal. Moreover, the push-pull circuit 02 may control the first external power terminal VDDI to be decoupled from the target node N0 and control the second external power terminal VSSI to be conducted to the target node N0 in a case that the target control signal is of the second electric potential. At this time, in the first external power terminal VDDI and the second external power terminal VSSI, a second power signal provided by the second external power terminal VSSI may be transmitted to the target node N0, that is, a signal written into the target node N0 at this time may be the second power signal. Thus, the purpose of writing the first power signal or the second power signal into the target node N0 is achieved.

The switching circuit 03 is coupled to the first control terminal Con1, the I/O interface, and the target node N0 respectively. The switching circuit 03 is configured to transmit an electric potential of the target node N0 to the I/O interface in response to a first control signal provided by the first control terminal Con1.

For example, the switching circuit 03 may control the target node N0 to be conducted with the I/O interface in a case that the first control signal provided by the first control terminal Con1 is of the first electric potential or the second electric potential, such that the signal written into the target node N0 is further transmitted to the I/O interface, that is, the first power signal or the second power signal is output to the I/O interface. The I/O interface may be further coupled to other apparatuses (e.g., application processor (AP)), and the power signal transmitted to the I/O interface may be employed by the display driver circuit to communicate with the other devices. Based on this, the circuits shown in FIG. 1 may be classified as an output portion of the display driver circuit. In addition, in FIG. 1, the first electric potential of the first control signal is identified as AVDD_int, and the second electric potential of the first control signal is identified as GND. The descriptions of the following embodiments are similar to those of the above embodiment and will not be repeated here.

The switching circuit 03 is provided to avoid direct coupling between the I/O interface and the push-pull circuit 02. In this way, a signal of a large electric potential signal received at the I/O interface may be avoided from impacting the push-pull circuit 02, and the purpose of protecting the push-pull circuit 02 may be achieved. Meanwhile, it can also avoid the problem of the I/O interface being damaged because of the output of a large electric potential signal to the I/O interface due to the abnormal push-pull circuit 02, and achieve the purpose of protecting the I/O interface.

Optionally, in the embodiment of the present disclosure, the first electric potential may be a high electric potential, and the second electric potential may be a low electric potential. Moreover, the electric potential of the first power signal provided by the first external power terminal VDDI may be greater than that of the second power signal provided by the second external power terminal VSSI. For example, the electric potential of the first power signal may be greater than 0, and the electric potential of the second power signal may be 0. In this way, the purpose of outputting different electric potentials that are equal to or greater than 0 to the I/O interface is achieved.

It should be noted that the first external power terminal VDDI and the second external power terminal VSSI may be external power terminals independent from the display driver circuit, that is, the first power signal and the second power signal may be external signals, instead of internal signals of the display driver circuit. In other words, signal sources from which the power signals are output to the I/O interface may be provided by an external power, and the signals generated by the internal circuit 01 of the display driver circuit only serve as the enable signals. Thus, the electric potentials of the first power signal and the second power signal may be flexibly set to achieve the selection of different electric potentials of the I/O interface. For example, the electric potential of the first power signal may be 1.2 V or 1.8 V, and the electric potential of the second power signal may be 0 V.

In summary, the embodiment of the present disclosure provides a display driver circuit including an internal circuit, a push-pull circuit and a switching circuit. The push-pull circuit is coupled to the internal circuit, a first external power terminal, a second external power terminal and a target node, and can control the on-off of the first external power terminal, the second external power terminal and the target node in response to a target control signal transmitted by the internal circuit. The switching circuit is coupled to the target node and the I/O interface of the display driver circuit, and can transmit an electric potential of the target node to the I/O interface of the display driver circuit, that is, a first power signal transmitted from the first external power terminal to the target node or a second power signal transmitted from the second external power terminal to the target node is further output to the I/O interface. In this way, the target control signal, the first power signal, and the second power signal may be flexibly set to transmit a plurality of signals of different electric potentials to the I/O interface, thereby improving the compatibility of the I/O interface.

Figure 2:
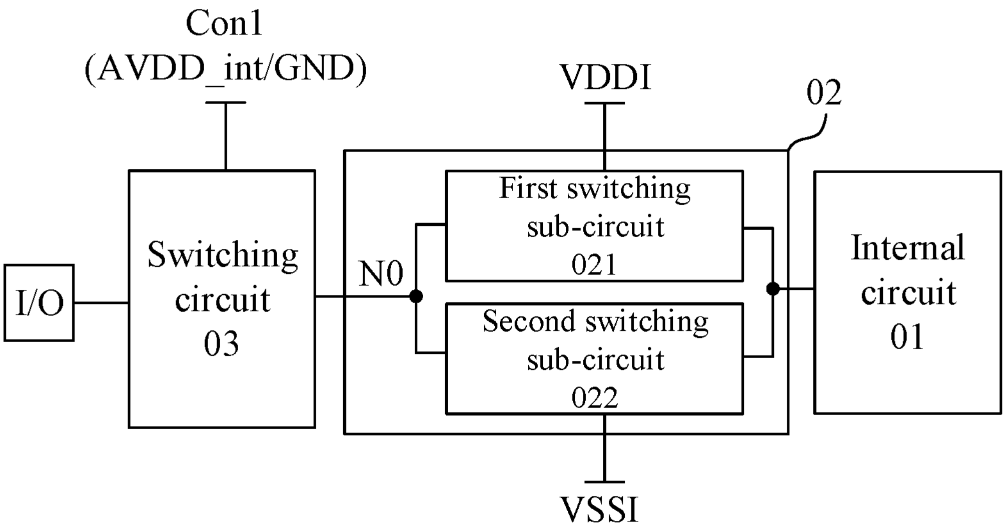
FIG. 2 is a schematic structural diagram of another display driver circuit according to an embodiment of the present disclosure.

FIG. 2 is a schematic structural diagram of another display driver circuit according to an embodiment of the present disclosure. As shown in FIG. 2, a push-pull circuit 02 included in the display driver circuit may include a first switching sub-circuit 021 and a second switching sub-circuit 022.

The first switching sub-circuit 021 may be coupled to the internal circuit 01, the first external power terminal VDDI, and the target node N0. The first switching sub-circuit 021 may be configured to control the on-off of the first external power terminal VDDI and the target node NO in response to the target control signal provided by the internal circuit 01.

For example, the first switching sub-circuit 021 may control the first external power terminal VDDI to be conducted with the target node N0 in a case that the target control signal is of the first electric potential, such that the first power signal is transmitted to the target node N0 and further output to the I/O interface through the switching circuit 03. Moreover, the first switching sub-circuit 021 may control the first external power terminal VDDI to be decoupled from the target node N0 in a case that the target control signal is of the second electric potential.

The second switching sub-circuit 022 may be coupled to the internal circuit 01, the second external power terminal VSSI, and the target node N0. The second switching sub-circuit 022 may be configured to control the on-off of the second external power terminal VSSI and the target node N0 in response to the target control signal provided by the internal circuit 01.

For example, the second switching sub-circuit 022 may control the second external power terminal VSSI to be conducted with the target node N0 in a case that the target control signal is of the second electric potential, such that the second power signal is transmitted to the target node N0 and further output to the I/O interface through the switching circuit 03. Moreover, the second switching sub-circuit 022 may control the first external power terminal VDDI to be decoupled from the target node N0 in a case that the target control signal is of the first electric potential.

Figure 3:
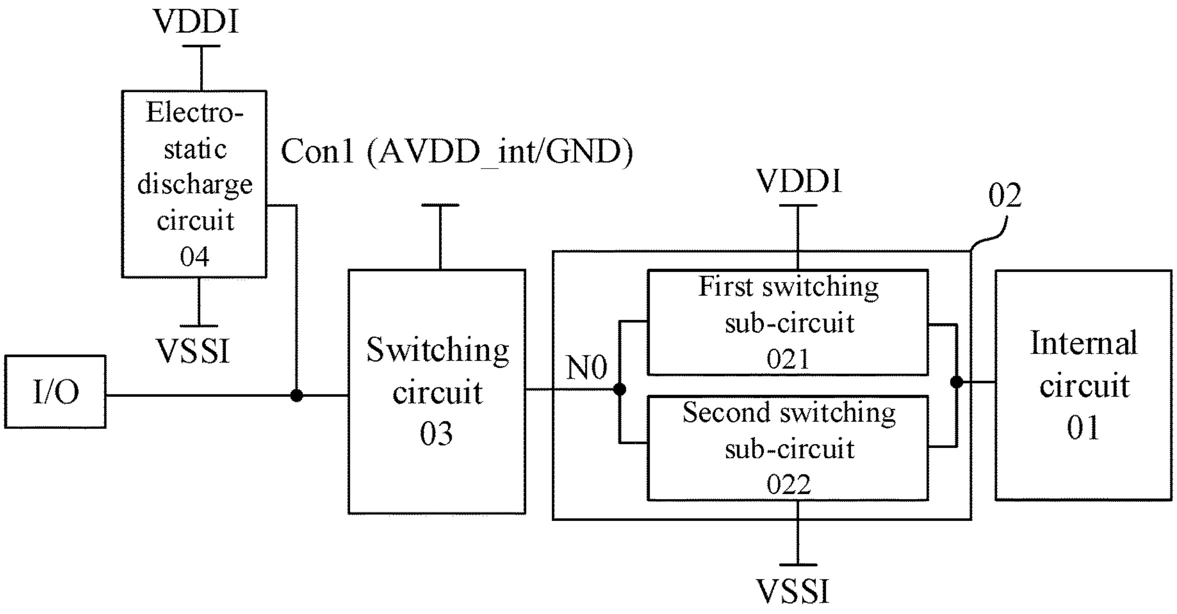
FIG. 3 is a schematic structural diagram of still another display driver circuit according to an embodiment of the present disclosure.

FIG. 3 is a schematic structural diagram of still another display driver circuit according to an embodiment of the present disclosure. As shown in FIG. 3, the display driver circuit according to the embodiment of the present disclosure may further include an electrostatic discharge (ESD) circuit 04.

The electrostatic discharge circuit 04 may be coupled to the first external power terminal VDDI, the second external power terminal VSSI, and the I/O interface respectively. The electrostatic discharge circuit 04 may be configured to discharge static electricity generated at the I/O interface based on the first power signal and the second power signal, thereby achieving the purpose of protecting the I/O interface.

Figure 4:
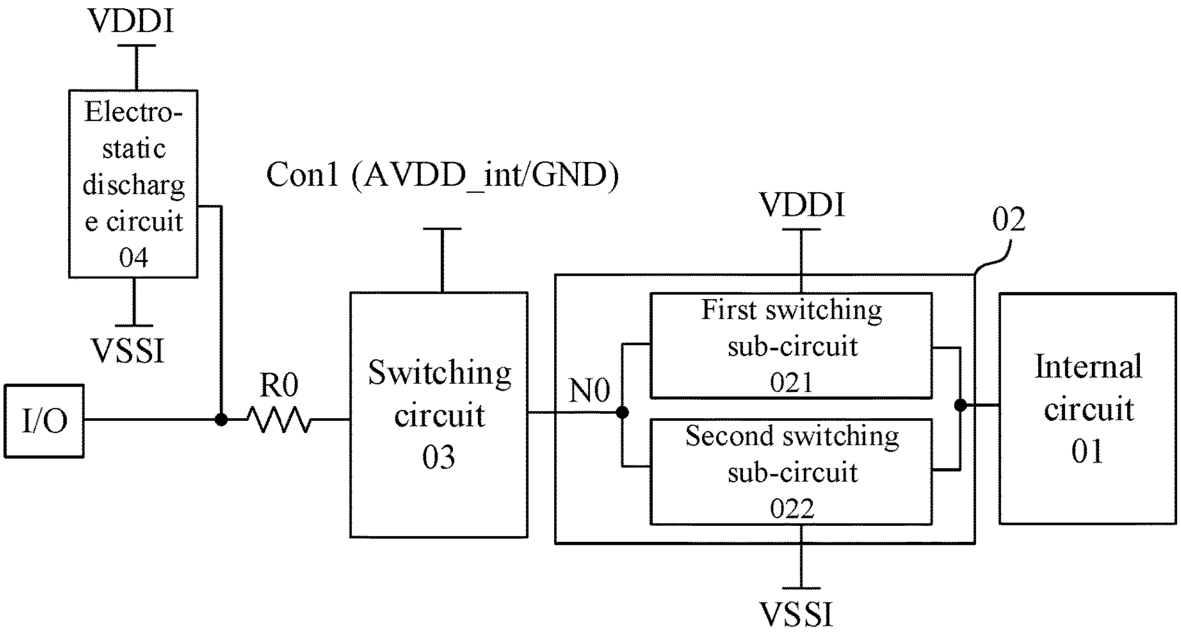
FIG. 4 is a schematic structural diagram of yet still another display driver circuit according to an embodiment of the present disclosure.

FIG. 4 is a schematic structural diagram of yet still another display driver circuit according to an embodiment of the present disclosure. As shown in FIG. 4, the display driver circuit may further include a current limiting resistor R0 connected in series between the switching circuit 03 and the I/O interface. The current limiting resistor R0 may be configured to perform current limiting protection on the electric potential transmitted to the I/O interface.

Figure 5:
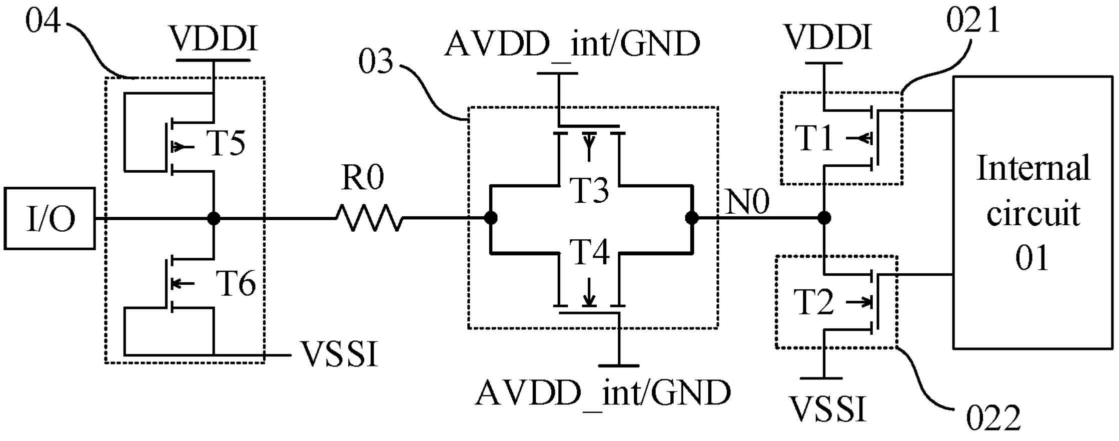
FIG. 5 is a schematic structural diagram of yet still another display driver circuit according to an embodiment of the present disclosure.

FIG. 5 is a schematic structural diagram of yet still another display driver circuit according to an embodiment of the present disclosure. As shown in FIG. 5, in the push-pull circuit 02 according to the embodiment of the present disclosure, the first switching sub-circuit 021 may include a first transistor T1. The second switching sub-circuit 022 may include a second transistor T2.

A gate of the first transistor may be coupled to the internal circuit 01, a first electrode of the first transistor T1 may be coupled to the first external power terminal VDDI, and a second electrode of the first transistor T1 may be coupled to the target node N0.

A gate of the second transistor T2 may be coupled to the internal circuit 01, a first electrode of the second transistor T2 may be coupled to the second external power terminal VSSI, and a second electrode of the second transistor T2 may be coupled to the target node N0.

Moreover, the first transistor T1 is of a different type from the second transistor T2. For example, with reference to schematic diagrams of the operating principles of the push-pull circuit 02 shown in FIGS. 5 and 6, it may be seen that in the embodiment of the present disclosure, the first transistor T1 coupled to the first external power terminal VDDI may be an N-type transistor, and the second transistor T2 coupled to the second external power terminal VSSI may be a P-type transistor. On this basis, in conjunction with FIG. 6, it may be seen that the push-pull circuit 02 includes an operating mode (1) and an operating mode (2).

In the operating mode (1), the internal circuit 01 may transmit a target control signal of a high electric potential to the push-pull circuit 02. At this time, the first transistor T1 is turned on, and the second transistor T2 is turned off. Accordingly, the first external power terminal VDDI is coupled to the target node N0 through the first transistor T1 which has been turned on. Moreover, the second external power terminal VSSI is decoupled from the target node N0 (indicated by dotted lines in FIG. 6). Further, the first power signal provided by the first external power terminal VDDI may be transmitted to the target node N0 through the first transistor T1 which has been turned on, and then further output to the I/O interface through the switching circuit 03.

In the operating mode (2), the internal circuit 01 may transmit a target control signal of a low electric potential to the push-pull circuit 02. At this time, the first transistor T1 is turned off, and the second transistor T2 is turned on. Accordingly, the first external power terminal VDDI is decoupled from the target node N0 (indicated by dotted lines in FIG. 6). Moreover, the second external power terminal VSSI is coupled to the target node N0 through the second transistor T2 which has been turned on. Further, the second power signal provided by the second external power terminal VSSI may be transmitted to the target node N0 through the second transistor T2, and then output to the I/O interface through the switching circuit 03.

Figure 6:
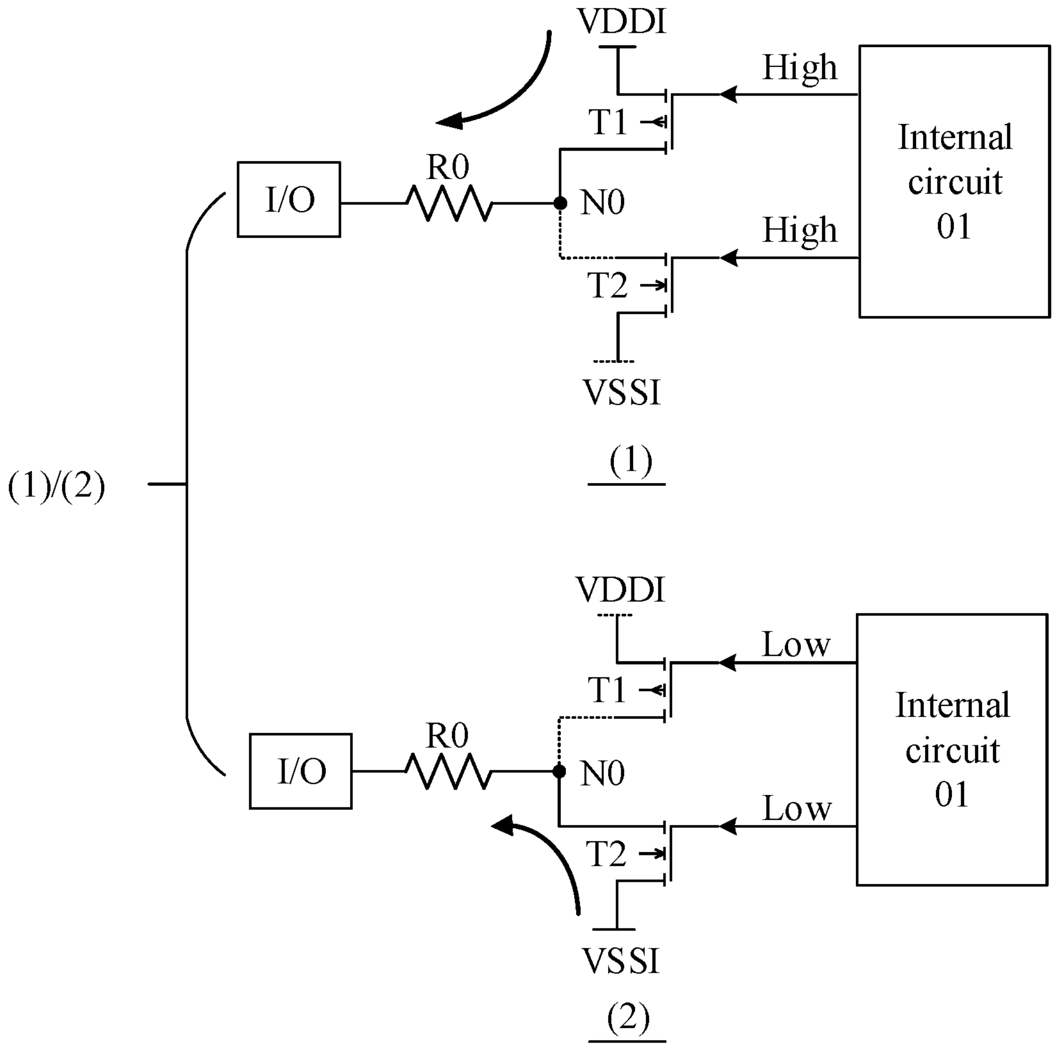
FIG. 6 is a schematic diagram of an operating principle of a push-pull circuit according to an embodiment of the present disclosure.

It should be noted that FIG. 6 does not show the target node N0 and the switching circuit 03. Certainly, in some embodiments, the first transistor T1 may also be a P-type transistor, and accordingly, the second transistor T2 may be an N-type transistor. On this basis, in a case that the target control signal is of the low electric potential, the first transistor T1 may be turned on, and the second transistor T2 may be turned off; and the first power signal provided by the first external power terminal VDDI is output to the I/O interface through the first transistor T1 which has been turned on and the switching circuit 03. In a case that the target control signal is of the high electric potential, the first transistor T1 may be turned off and the second transistor T2 may be turned on; and the second power signal provided by the second external power terminal VSSI is output to the I/O interface through the second transistor T1 which has been turned on and the switching circuit 03.

With continued reference to FIG. 5, it may be seen that the switching circuit 03 according to the embodiment of the present disclosure may include a third transistor T3 and a fourth transistor T4.

A gate of the third transistor T3 and a gate of the fourth transistor T4 may both be coupled to the first control terminal Con1, that is, they can both receive the first control signal of the first electric potential AVDD_int and the second control signal of the second electric potential GND. A first electrode of the third transistor T3 and a first electrode of the fourth transistor T4 may both be coupled to the target node N0. A second electrode of the third transistor T3 and a second electrode of the fourth transistor T4 may both be coupled to the I/O interface.

Figure 7:
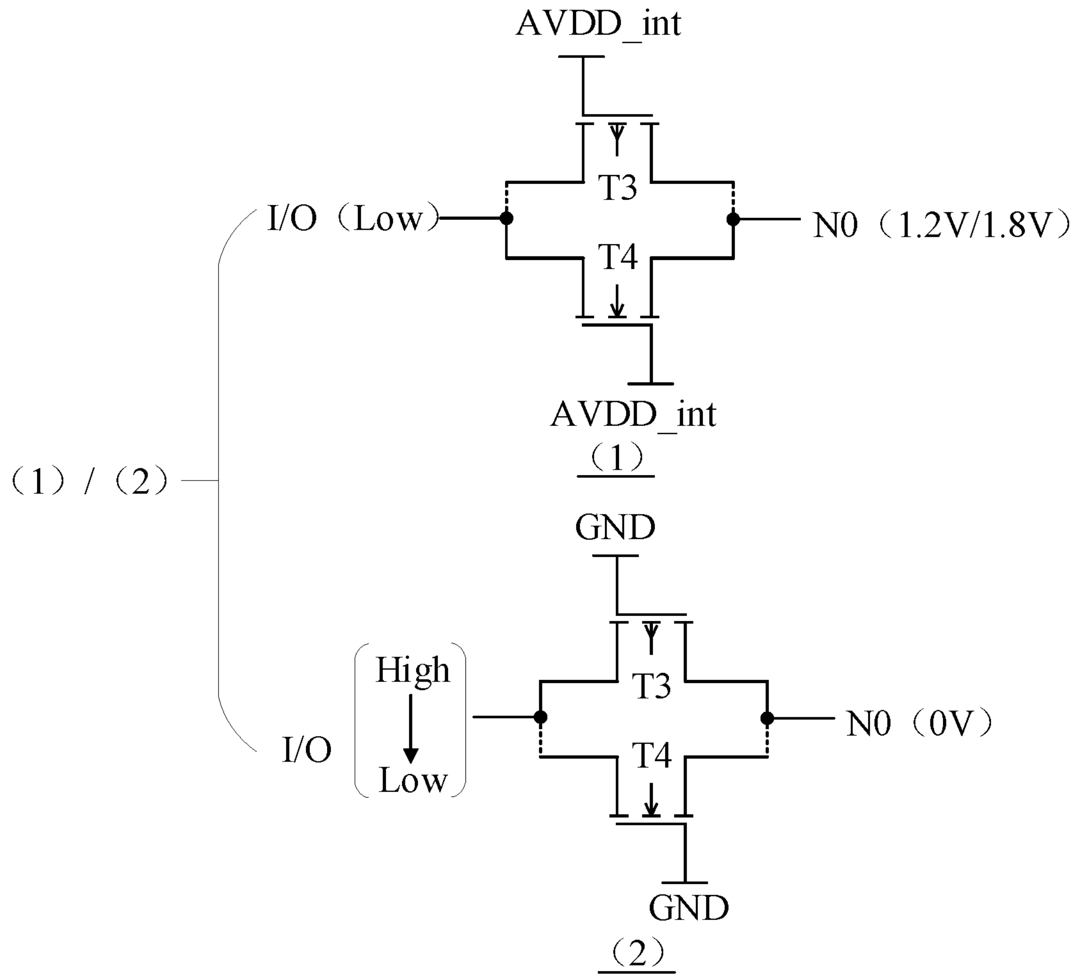
FIG. 7 is a schematic diagram of an operating principle of a switching circuit according to an embodiment of the present disclosure.

Moreover, the third transistor T3 is of a different type from the fourth transistor T4. For example, with reference to schematic diagrams of the operating principles of the switching circuit 03 shown in FIGS. 5 and 7, it may be seen that in the embodiment of the present disclosure, the third transistor T3 may be a P-type transistor and the fourth transistor T4 may be an N-type transistor. On this basis, in conjunction with FIG. 7, it may be seen that the switching circuit 03 includes an operating mode (1) and an operating mode (2).

In the operating mode (1), an electric potential of the first control signal provided by the first control terminal Con1 may be of the first electric potential AVDD_int. At this time, the third transistor T3 is turned off (indicated by dotted lines in FIG. 7), and the fourth transistor T4 is turned on. Accordingly, the target node N0 communicates with the I/O interface through the fourth transistor T4. Further, the signal written into the target node N0 is further output to the I/O interface through the fourth transistor T4. Moreover, at this time, the signal written into the target node N0 is the first power signal at an electric potential of 1.2 V/1.8 V. That is, in conjunction with FIG. 6, in the embodiment of the present disclosure, the electric potential of the first control signal and the electric potential of the target control signal transmitted by the internal circuit 01 may be at the first electric potential synchronously, such that the first power signal can be reliably output to the I/O interface through the fourth transistor T4, to pull up the low electric potential at the I/O interface to 1.2 V/1.8 V.

In the operating mode (2), the electric potential of the second control signal provided by the first control terminal Con1 may be the second electric potential GND. At this time, the third transistor T3 is turned on and the fourth transistor T4 is turned off (indicated by dotted lines in FIG. 7). Accordingly, the target node N0 communicates with the I/O interface through the third transistor T3. Further, the signal written into the target node N0 is further output to the I/O interface through the third transistor T3. Moreover, at this time, the signal written into the target node N0 is the second power signal at the electric potential of 0 V. That is, in conjunction with FIG. 6, in the embodiment of the present disclosure, the electric potential of the first control signal and the electric potential of the target control signal transmitted by the internal circuit 01 may be at the second electric potential synchronously, such that the second power signal can be reliably output to the I/O interface through the third transistor T3 to pull down the high electric potential at the I/O interface to a low electric potential, such as 0 V.

In conjunction with the operating principle of the switching circuit 03 described above, it may be seen that the electric potential at the I/O interface may be reliably pulled down or pulled up by providing a parallel structure including the N-type transistor and the P-type transistor. In conjunction with FIG. 6, in a case that the push-pull circuit 02 and the switching circuit 03 are both in the operating mode (1), the operating mode (1) may be considered as a normal operating mode which is output to the I/O interface. In a case that the push-pull circuit 02 and the switching circuit 03 are both in the operating mode (2), the operating mode (2) may be considered as an operating mode for pulling down the electric potential at the I/O interface to form low level output. Therefore, many scenarios may be adapted to.

Certainly, in some embodiments, the third transistor T3 may also be an N-type transistor, and accordingly the fourth transistor T4 may be a P-type transistor. On this basis, in a case that the first control signal is of the first electric potential AVDD_int, the third transistor T3 may be turned on, the fourth transistor T4 may be turned off, and the target node N0 communicates with the I/O interface through the third transistor T3. Moreover, in a case that the first control signal is of the second electric potential GND, the third transistor T3 may be turned off, the fourth transistor T4 may be turned on, and the target node N0 communicates with the I/O interface through the fourth transistor T4.

With continued reference to FIG. 5, it may be seen that the electrostatic discharge circuit 04 according to the embodiment of the present disclosure may include a fifth transistor T5 and a sixth transistor T6.

A gate and a first electrode of the fifth transistor T5 may both be coupled to the first external power terminal VDDI, and a second electrode of the fifth transistor T5 may be coupled to the I/O interface.

A gate and a first electrode of the sixth transistor T6 may both be coupled to the second external power terminal VSSI, and a second electrode of the sixth transistor T6 may be coupled to the I/O interface.

On this basis, the fifth transistor T5 may reliably discharge static electricity generated at the I/O interface based on the first power signal provided by the first external power terminal VDDI. The sixth transistor T6 may reliably discharge static electricity generated at the I/O interface based on the second power signal provided by the second external power terminal VSSI to further protect the I/O interface.

Figure 8:
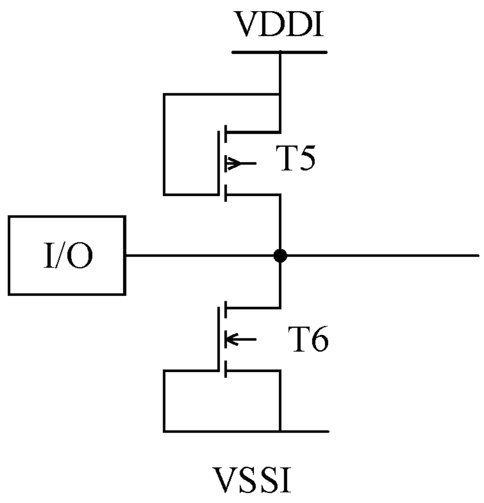
FIG. 8 is a schematic structural diagram of an electrostatic discharge circuit according to an embodiment of the present disclosure.

Moreover, the fifth transistor T5 may be of a different type from the sixth transistor T6. For example, with reference to the structural schematic diagrams of the electrostatic discharge circuit shown in FIGS. 5 and 8, it may be seen that in the embodiment of the present disclosure, the fifth transistor T5 may be a P-type transistor, and the sixth transistor T6 may be an N-type transistor.

Currently, a diode is generally employed to discharge static electricity generated at the I/O interface. However, the diode has a poor electrostatic discharge effect due to a large voltage drop (generally between 0.5 V and 1.2 V). The voltage drop of the transistor may be low, generally between 0.3 V and 0.6 V. Therefore, in the embodiment of the present disclosure, by replacing a common diode with an N-type transistor and a P-type transistor, the discharge of the static electricity generated at the I/O interface may be facilitated, such that the static electricity protection performance of the ESD circuit is improved.

Figure 9:
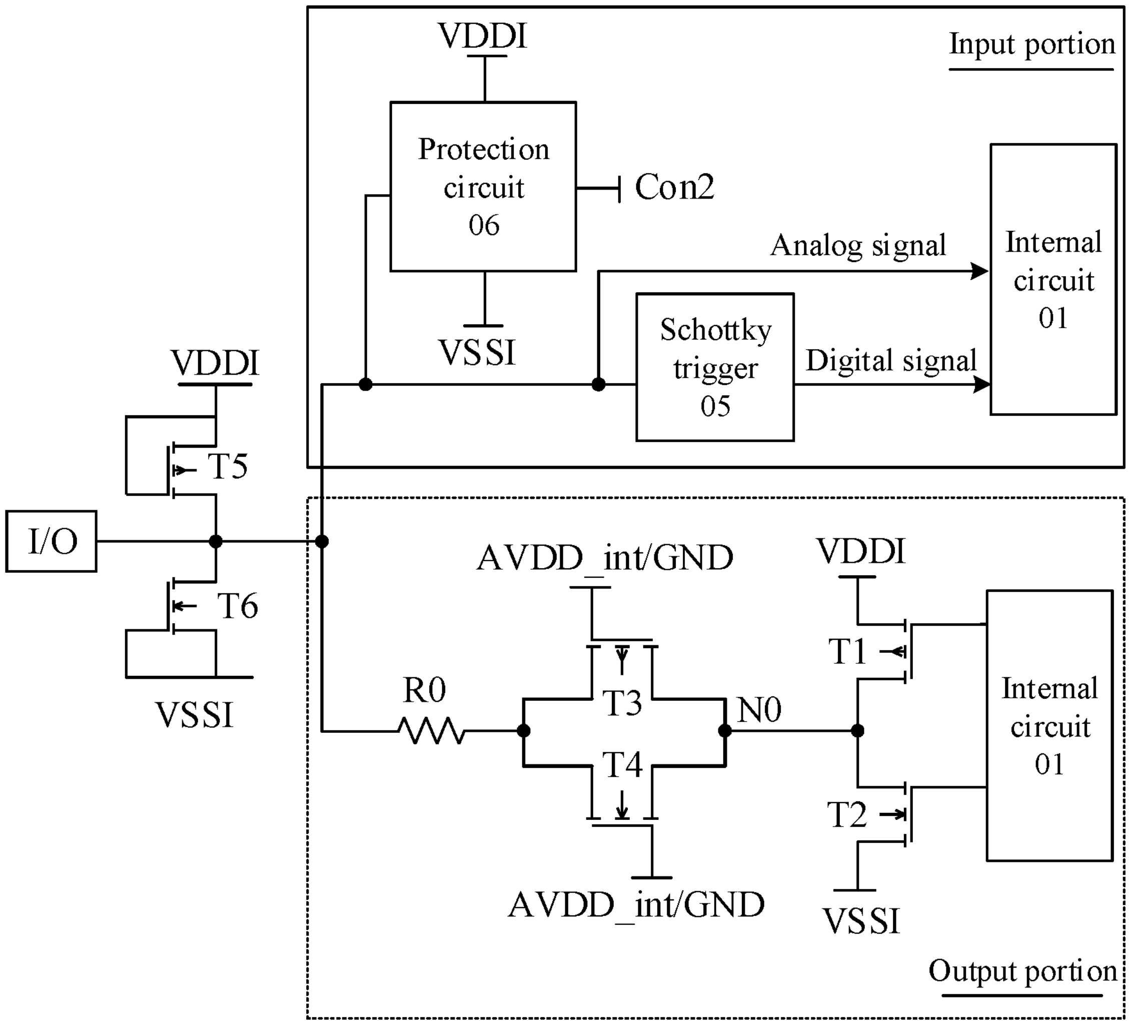
FIG. 9 is a schematic structural diagram of yet still another display driver circuit according to an embodiment of the present disclosure.

FIG. 9 is a schematic structural diagram of yet still another display driver circuit according to an embodiment of the present disclosure. As shown in FIG. 9, the display driver circuit according to the embodiment of the present disclosure may further include a Schottky trigger 05 and a protection circuit 06.

The Schottky trigger 05 may be coupled to the internal circuit 01 and the I/O interface. The Schottky trigger 05 may be configured to receive an analog power signal (analog signal for short) provided by the I/O interface, convert the analog power signal into a digital power signal (digital signal for short), and transmit the digital power signal to the internal circuit 01.

For example, the Schottky trigger 05 may convert a signal from the I/O interface into a signal "0" or "1". For example, the power signal of an electric potential of 1.2 V is converted into a digital signal "1" from an analog signal, and then input to the internal circuit 01, so as to drive components in the internal circuit 01 to operate. Moreover, the power signal at the electric potential of 0 V is converted into a digital signal "0" from the analog signal, and then input to the internal circuit 01, so as to drive components in the internal circuit 01 to operate.

Moreover, with reference to FIG. 9, it may be seen that the internal circuit 01 according to the embodiment of the present disclosure may further be directly coupled to the I/O interface. The internal circuit 01 may further be configured to receive the analog power signal provided by the I/O interface. That is, the internal circuit 01 may further directly receive the analog signal (e.g., a power signal of 1.2 V or 0 V) input from the I/O interface.

On this basis, the Schottky trigger 05 and the protection circuit 06 shown in FIG. 9 may be classified as an input portion of the display driver circuit. It should be noted that the signal input from the I/O interface to the internal circuit 01 may be from other external apparatuses (such as the application processor AP) coupled to the display driver circuit. Moreover, the internal circuit 01 of the input portion and the internal circuit 01 of the output portion may be the same internal circuit 01.

The protection circuit 06 may be coupled to the I/O interface, the first external power terminal VDDI, the second external power terminal VSSI and the second control terminal Con2 respectively. The protection circuit 06 may be configured to stabilize the electric potential at the I/O interface based on the first power signal and the second power signal in response to the second control signal provided by the second control terminal Con2.

For example, the protection circuit 06 may adjust the electric potential at the I/O interface based on the first power signal and the second power signal in a case that the second control signal provided by the second control terminal Con2 is of the first electric potential, so as to achieve the purpose of stabilizing the electric potential at the I/O interface. Moreover, the protection circuit 06 may stop operating in a case that the second control signal is of the second electric potential.

Figure 10:
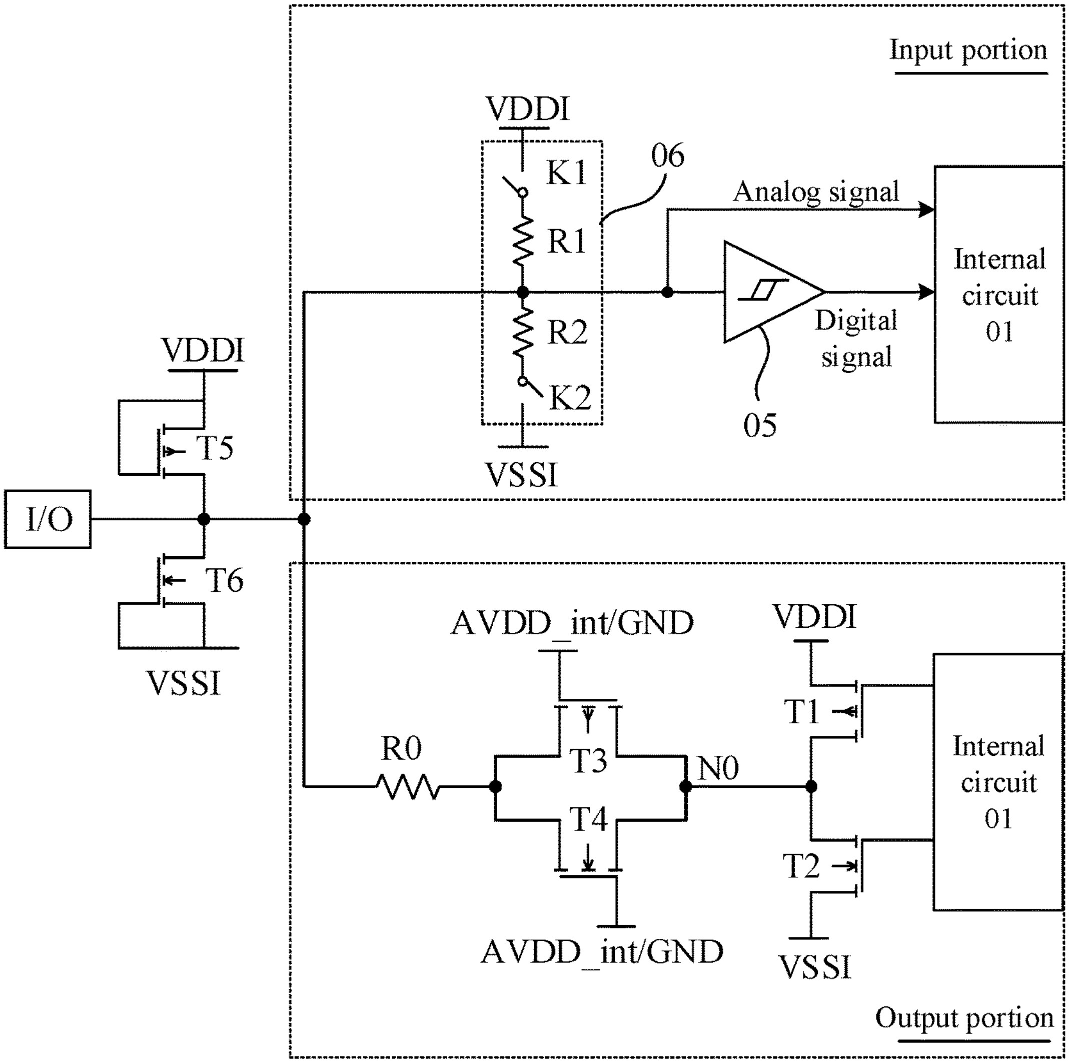
FIG. 10 is a schematic structural diagram of yet still another display driver circuit according to an embodiment of the present disclosure.

FIG. 10 shows a schematic structural diagram of yet still another display driver circuit based on the circuit structure shown in FIG. 5. As shown in FIG. 10, the protection circuit 06 according to the embodiment of the present disclosure may include a pull-up resistor R1, a pull-down resistor R2, a first switch K1, and a second switch K2.

A control terminal of the first switch K1 may be coupled to the second control terminal Con2 (not shown in FIG. 10), a first terminal of the first switch K1 may be coupled to the first external power terminal VDDI, and a second terminal of the first switch K1 may be coupled to a first terminal of the pull-up resistor R1.

A control terminal of the second switch K2 may be coupled to the second control terminal Con2 (not shown in FIG. 10), a first terminal of the second switch K2 may be coupled to the second external power terminal VSSI, and a second terminal of the second switch K2 may be coupled to a first terminal of the pull-down resistor R2.

A second terminal of the pull-up resistor R1 and a second terminal of pull-down resistor R2 may both be coupled to the I/O interface.

On this basis it can be seen that, in a case that the second control signal provided by the second control terminal Con2 is of the first electric potential, the first switch K1 and the second switch K2 are both turned off. The first external power terminal VDDI and the second external power terminal VSSI both communicate with the I/O interface. That is, the first external power terminal VDDI, the pull-up resistor R1, the second external power terminal VSSI, the pull-down resistor R2, and the I/O interface form a path. At this time, the electric potential at the I/O interface may tend to be stable under an action of the pull-up resistor R1 and the pull-down resistor R2. In a case that the second control signal is of the second electric potential, the first switch K1 and the second switch K2 are turned off. The first external power terminal VDDI and the second external power terminal VSSI are both decoupled from the I/O interface.

It should be noted that, in a case that the I/O interface is in a floating state, the electric potential of the second control signal may be set as the first electric potential, so as to effectively stabilize the level stability of the I/O interface in the floating state.

It should be further noted that the first control terminal Con1 and the second control terminal Con2 may also be coupled to the internal circuit 01, and receive respectively the first control signal and the second control signal provided thereto by the internal circuit 01. The display driver circuit may generally include a plurality of I/O interfaces. Each of the I/O interfaces may be coupled to the circuit structure shown in FIG. 10, thereby improving the compatibility of each of the I/O interfaces.

In summary, the embodiment of the present disclosure provides a display driver circuit including an internal circuit, a push-pull circuit and a switching circuit. The push-pull circuit is coupled to the internal circuit, a first external power terminal, a second external power terminal, and a target node, and can control the on-off of the first external power terminal, the second external power terminal and the target node in response to a target control signal transmitted by the internal circuit. The switching circuit is coupled to the target node and the I/O interface of the display driver circuit, and can transmit an electric potential of the target node to the I/O interface of the display driver circuit, that is, a first power signal transmitted from the first external power terminal to the target node or a second power signal transmitted from the second external power terminal to the target node is further output to the I/O interface. In this way, the target control signal, the first power signal, and the second power signal may be flexibly set to transmit a plurality of signals of different electric potentials to the I/O interface, thereby improving the compatibility of the I/O interface.

Figure 11:
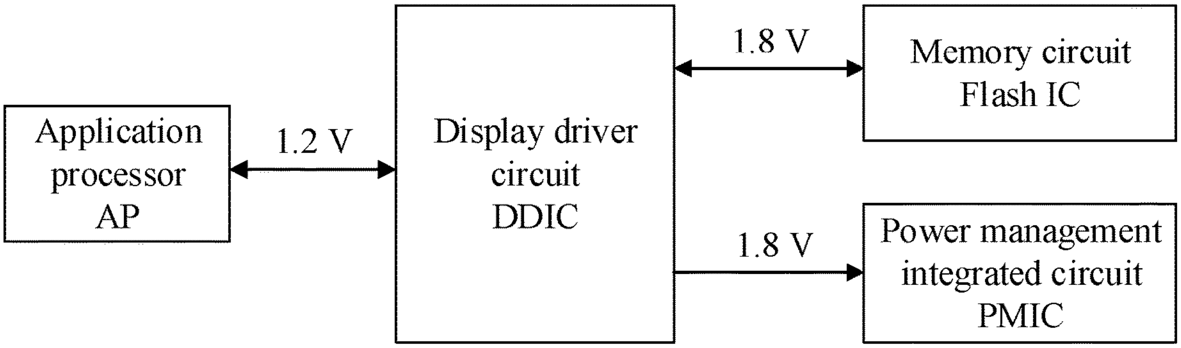
FIG. 11 is a schematic structural diagram of a display device according to an embodiment of the present disclosure.

FIG. 11 is a schematic structural diagram of a display device according to an embodiment of the present disclosure. As shown in FIG. 11, the display device may include an application processor (AP), a memory circuit (Flash IC), a power management integrated circuit (PMIC), and the display driver circuit (DDIC) as shown in any one of the above figures.

The application processor (AP), the memory circuit (Flash IC), and the power management integrated circuit (PMIC) may all be coupled to the I/O interfaces of the display driver circuit (DDIC), and the I/O interfaces coupled by the application processor (AP), the memory circuit (Flash IC) and the power management integrated circuit (PMIC) may be different. On this basis, the application processor (AP) may be in bidirectional communication with the display driver circuit (DDIC), the memory circuit (Flash IC) may be in bidirectional communication with the display driver circuit (DDIC), and the display driver circuit (DDIC) may be configured to provide a power signal to the power management integrated circuit (PMIC).

Optionally, with reference to FIG. 11, it may further be seen that the communication voltage for the application processor (AP) to communicate with the display driver circuit (DDIC) may be 1.2 V due to manufacturing process influences. The voltage at which the memory circuit (Flash IC) interacts with the display driver circuit (DDIC) may be 1.8 V. Moreover, the display driver circuit (DDIC) may provide a power signal of 1.8 V to the power management integrated circuit (PMIC).

Optionally, the display device according the embodiment of the present disclosure may be any product or component with a display function, such as an OLED display device, a mobile phone, a tablet computer, a flexible display device, a television and a display.

Terms used in detailed description of the present disclosure are defined to merely explain the embodiments of the present disclosure and are not intended to limit of the present disclosure. Unless otherwise defined, technical or scientific terms used in detailed description of the present disclosure should have the ordinary meanings as understood by those of ordinary skill in the art to which the present disclosure belongs.

For example, word “first”, “second”, “third” or the like, which is used in the specification and claims of the present disclosure, is not intended to indicate any order, quantity or importance, but is merely defined to distinguish different components.

Likewise, “a”, “an” or other similar words does not indicate a limitation of quantity, but rather the presence of at least one.

“Include”, “comprise” or other similar words means that the elements or objects stated before “include” or “comprise” encompass the elements or objects and equivalents thereof listed after “include” or “comprise”, but does not exclude other elements or objects.

“Up”, “down”, “left”, “right” or the like is only defined to indicate relative position relationship. In a case that the absolute position of the described object is changed, the relative position relationship may be changed accordingly. “Connected” or “coupled” refers to an electrical connection.

“And/or” indicates that three relationships may be present. For example, A and/or B may indicate that only A is present, both A and B are present, and only B is present. The symbol “/” generally indicates an “or” relationship between the associated objects.

Described above are merely optional embodiments of the present disclosure and are not intended to limit the present disclosure. Any modifications, equivalents, improvements, and the like, made within the spirit and principle of the present disclosure, should be included in the protection scope of the present disclosure.

The invention claimed is:

1. A display driver circuit, comprising an I/O interface, an internal circuit, a push-pull circuit and a switching circuit; wherein, the internal circuit is coupled to the push-pull circuit and the internal circuit is configured to transmit a target control signal to the push-pull circuit;

the push-pull circuit is further coupled to a first external power terminal, a second external power terminal and a target node respectively, and the push-pull circuit is configured to control an on-off of the first external power terminal and the target node and an on-off of the second external power terminal and the target node in response to the target control signal;

the switching circuit is coupled to a first control terminal, the I/O interface and the target node respectively, and the switching circuit is configured to transmit an electric potential of the target node to the I/O interface in response to a first control signal provided by the first control terminal; and an electric potential of a first power signal provided by the first external power terminal is greater than that of a second power signal provided by the second external power terminal, wherein the electric potential of the first power signal is 1.2 V or 1.8 V, and the electric potential of the second power signal is 0 V.

2. The display driver circuit according to claim 1, wherein the push-pull circuit comprises a first switching sub-circuit and a second switching sub-circuit;

the first switching sub-circuit is coupled to the internal circuit, the first external power terminal and the target node respectively, and the first switching sub-circuit is configured to control the on-off of the first external power terminal and the target node in response to the target control signal provided by the internal circuit; and the second switching sub-circuit is coupled to the internal circuit, the second external power terminal and the target node respectively, and the second switching sub-circuit is configured to control the on-off of the second external power terminal and the target node in response to the target control signal provided by the internal circuit.

3. The display driver circuit according to claim 2, wherein the first switching sub-circuit comprises a first transistor, the second switching sub-circuit comprises a second transistor, and the first transistor is of a different type from the second transistor;

a gate of the first transistor is coupled to the internal circuit, a first electrode of the first transistor is coupled to the first external power terminal, and a second electrode of the first transistor is coupled to the target node; and a gate of the second transistor is coupled to the internal circuit, a first electrode of the second transistor is coupled to the second external power terminal, and a second electrode of the second transistor is coupled to the target node.

4. The display driver circuit according to claim 3, wherein the first transistor is a P-type transistor, and the second transistor is an N-type transistor.

5. The display driver circuit according to claim 1, wherein the switching circuit comprises a third transistor and a fourth transistor, and the third transistor is of a different type from the fourth transistor; and a gate of the third transistor and a gate of the fourth transistor are both coupled to the first control terminal, a first electrode of the third transistor and a first electrode of the fourth transistor are both coupled to the target node, and a second electrode of the third transistor and a second electrode of the fourth transistor are both coupled to the I/O interface.

6. The display driver circuit according to claim 5, wherein the third transistor is a P-type transistor, and the fourth transistor is an N-type transistor.

7. The display driver circuit according to claim 1, wherein the display driver circuit further comprises an electrostatic discharge circuit;

the electrostatic discharge circuit is coupled to the first external power terminal, the second external supply terminal and the I/O interface respectively, and the electrostatic discharge circuit is configured to discharge static electricity generated at the I/O interface based on the first power signal and the second power signal.

8. The display driver circuit according to claim 7, wherein the electrostatic discharge circuit comprises a fifth transistor and a sixth transistor, and the fifth transistor is of a different type from the sixth transistor;

a gate and a first electrode of the fifth transistor are both coupled to the first external power terminal, and a second electrode of the fifth transistor is coupled to the I/O interface; and a gate and a first electrode of the sixth transistor are both coupled to the second external power terminal, and a second electrode of the sixth transistor is coupled to the I/O interface.

9. The display driver circuit according to claim 8, wherein the fifth transistor is a P-type transistor, and the sixth transistor is an N-type transistor.

10. The display driver circuit according to claim 1, wherein the display driver circuit further comprises a current limiting resistor connected in series between the switching circuit and the I/O interface, and the current limiting resistor is configured to perform current limiting protection on the electric potential transmitted to the I/O interface.

11. The display driver circuit according to claim 1, wherein the display driver circuit further comprises a Schottky trigger and a protection circuit;

the Schottky trigger is coupled to the internal circuit and the I/O interface respectively, and the Schottky trigger is configured to receive an analog power signal provided by the I/O interface, convert the analog power signal into a digital power signal and transmit the digital power signal to the internal circuit;

the protection circuit is coupled to the I/O interface, the first external power terminal, the second external power terminal and a second control terminal respectively, and the protection circuit is configured to stabilize an electric potential at the I/O interface based on the first power signal and the second supply signal in response to a second control signal provided by the second control terminal; and the internal circuit is further coupled to the I/O interface, and the internal circuit is further configured to receive the analog power signal provided by the I/O interface.

12. The display driver circuit according to claim 11, wherein the protection circuit comprises a pull-up resistor, a pull-down resistor, a first switch, and a second switch;

a control terminal of the first switch is coupled to the second control terminal, a first terminal of the first switch is coupled to the first external power terminal, and a second terminal of the first switch is coupled to a first terminal of the pull-up resistor;

a control terminal of the second switch is coupled to the second control terminal, a first terminal of the second switch is coupled to the second external power terminal, and a second terminal of the second switch is coupled to a first terminal of the pull-down resistor; and a second terminal of the pull-up resistor and a second terminal of the pull-down resistor are both coupled to the I/O interface.

13. A display device, wherein the display device comprises an application processor, a memory circuit, a power management integrated circuit, and the display driver circuit according to claim 1;

the application processor, the memory circuit, and the power management integrated circuit are all coupled to I/O interfaces of the display driver circuit, and the I/O interfaces coupled by the application processor, the memory circuit and the power management integrated circuit are different; and the application processor is in bidirectional communication with the display driver circuit, the memory circuit is in bidirectional communication with the display driver circuit, and the display driver circuit is configured to provide a power signal to the power management integrated circuit.

14. The display device according to claim 13, wherein the display device comprises an organic light-emitting diode OLED display device.

* * * * *